(12) United States Patent
Gaither

(10) Patent No.: US 11,639,856 B2
(45) Date of Patent: May 2, 2023

(54) INFRASTRUCTURE PLANNING TOOL

(71) Applicant: Toyota Motor Engineering & Manufacturing North America, Inc., Plano, TX (US)

(72) Inventor: Geoffrey D. Gaither, Brighton, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 109 days.

(21) Appl. No.: 16/872,182

(22) Filed: May 11, 2020

(65) Prior Publication Data

US 2021/0348934 A1 Nov. 11, 2021

(51) Int. Cl.
*G01C 21/34* (2006.01)
*B60W 60/00* (2020.01)

(52) U.S. Cl.
CPC ..... *G01C 21/3469* (2013.01); *B60W 60/0011* (2020.02); *B60W 60/0023* (2020.02); *B60W 60/0025* (2020.02)

(58) Field of Classification Search
CPC ............ G01C 21/3469; G01C 21/3697; G01C 21/3617; G01C 21/34; G01C 21/26; G01C 21/3484; G01C 21/3415; G01C 21/343; G01C 21/3438; G01C 21/3664; G01C 21/3407; G01C 21/3453; G01C 21/36; G01C 21/3461; G01C 21/3632; G01C 21/3691; G01C 21/3679; G01C 21/20; G01C 21/3492; G01C 21/3667;
(Continued)

(56) References Cited

U.S. PATENT DOCUMENTS 8,446,124 B2  5/2013 Nagy et al.
8,577,528 B2  11/2013 Uyeki
(Continued)

FOREIGN PATENT DOCUMENTS

DE  102015008968 A1  1/2017
DE  102018210766 A1  1/2020
(Continued)

OTHER PUBLICATIONS

Installing Public Electric Vehicle Charging Stations: A Site Suitability Analysis in Los Angeles County, California. May 2016, Jin.

*Primary Examiner* — Shon G Foley
(74) *Attorney, Agent, or Firm* — Snell & Wilmer LLP

(57) ABSTRACT

Methods, systems, devices and apparatuses for an infrastructure planning tool. The infrastructure planning tool includes a navigation unit. The navigation unit is configured to determine a location of a vehicle. The infrastructure planning tool includes a processor. The processor is configured to determine a route within an off-road real property to traverse by the vehicle using the location of the vehicle over a period of time. The processor is configured to determine or estimate an amount of energy used by the vehicle to traverse the route. The processor is configured to determine a location along the route to place critical based on the amount of energy used. The processor is configured to render, on a display, a graphical representation that includes the route, the off-road real property and the location along the route to place the critical infrastructure.

20 Claims, 5 Drawing Sheets

(58) Field of Classification Search
CPC ............ G01C 21/3476; G01C 21/3682; G01C 21/362; G01C 21/3676; G01C 21/3605; G01C 21/00; G01C 21/32; G01C 21/3423; G01C 21/367; G01C 21/3446; G01C 21/165; G01C 23/00; G01C 3/32; G01C 21/3602; G01C 21/206; G01C 21/3626; G01C 21/365; G01C 3/06; G01C 21/28; G01C 19/5776; G01C 21/005; G01C 21/3658; G01C 21/3673; G01C 21/3685; G01C 3/08; G01C 21/16; G01C 5/00; G01C 21/14; G01C 21/203; G01C 21/3614; G01C 21/3629; G01C 21/3641; G01C 21/3644; G01C 21/3655; G01C 21/3694; G01C 21/3815; G01C 22/006; G01C 22/02; G01C 25/00; G01C 3/02; G01C 11/02; G01C 15/00; G01C 15/04; G01C 21/265; G01C 21/3804; G01C 21/3807; G01C 21/3811; G01C 21/3822; G01C 21/3844; G01C 21/3848; G01C 21/3889; G01C 22/00; G01C 7/04; G01C 9/02; B60W 2510/10; B60W 2510/28; B60W 2540/106; B60W 2552/35; B60W 2554/406; B60W 2554/80; B60W 2554/801; B60W 2710/0622; B60W 2900/00; B60W 50/038; B60W 60/00253; B60W 20/18; B60W 2050/0008; B60W 2050/0057; B60W 2050/0067; B60W 2050/0083; B60W 2050/0085; B60W 2050/046; B60W 2300/145; B60W 2510/0695; B60W 2510/101; B60W 2510/1045; B60W 2510/1095; B60W 2530/211; B60W 2540/103; B60W 2540/21; B60W 2710/0672; B60W 2710/085; B60W 2710/1083; B60W 2710/24; B60W 2720/30; B60W 2720/406; B60W 30/045; B60W 30/165; B60W 30/1846; B60W 40/00; B60W 40/068; B60W 50/02; B60W 10/14; B60W 10/182; B60W 2050/0006; B60W 2050/0054; B60W 2050/0064; B60W 2300/126; B60W 2510/0283; B60W 2520/263; B60W 2540/20; B60W 2554/802; B60W 2710/20; B60W 2710/28; B60W 30/146; B60W 30/18145; B60W 40/072; B60W 50/029; B60W 60/001; B60W 10/111; B60W 10/198; B60W 2040/0809; B60W 2050/0002; B60W 2050/0004; B60W 2050/0041; B60W 2050/0292; B60W 2300/36; B60W 2420/54; B60W 2510/02; B60W 2510/0233; B60W 2510/025; B60W 2510/086; B60W 2510/088; B60W 2510/09; B60W 2520/06; B60W 2530/13; B60W 2530/213; B60W 2540/14; B60W 2540/165; B60W 2540/22; B60W 2540/221; B60W 2554/4042; B60W 2556/05; B60W 2710/02; B60W 2710/087; B60W 2710/09; B60W 2710/22; B60W 2720/04; B60W 2754/30; B60W 30/025; B60W 30/18045; B60W 30/181; B60W 30/18154; B60W 30/1884; B60W 50/0225; B60W 50/087; B60W 50/16; B60W 10/103; B60W 10/107; B60W 10/192; B60W 2050/0012; B60W 2050/0045; B60W 2300/10; B60W 2300/18; B60W 2300/34; B60W 2420/40; B60W 2510/0652; B60W 2510/0671; B60W 2510/108; B60W 2520/16; B60W 2540/225; B60W 2540/24; B60W 2710/0633; B60W 2710/0638; B60W 2710/1072; B60W 2710/188; B60W 2720/28; B60W 30/18159; B60W 30/1819; B60W 50/023; B60W 50/045; B60W 60/0021; B60W 2040/0872; B60W 2040/1307; B60W 2050/0005; B60W 2050/0011; B60W 2050/0016; B60W 2050/0018; B60W 2050/022; B60W 2050/0028; B60W 2050/0037; B60W 2050/0042; B60W 2050/005; B60W 2050/0051; B60W 2050/0055; B60W 2050/0062; B60W 2050/0063; B60W 2050/0072; B60W 2050/009; B60W 2050/0094; B60W 2050/021; B60W 2050/0297; B60W 2050/065; B60W 2300/12; B60W 2300/15; B60W 2300/152; B60W 2300/185; B60W 2510/0609; B60W 2510/0614; B60W 2510/0661; B60W 2510/082; B60W 2510/1035; B60W 2510/1075; B60W 2510/12; B60W 2510/125; B60W 2510/186; B60W 2510/188; B60W 2510/22; B60W 2520/20; B60W 2520/30; B60W 2520/40; B60W 2530/20; B60W 2540/049; B60W 2554/402; B60W 2554/4026; B60W 2554/4029; B60W 2554/4041; B60W 2555/00; B60W 2555/80; B60W 2710/022; B60W 2710/023; B60W 2710/1016; B60W 2710/1055; B60W 2710/1077; B60W 2710/1094; B60W 2710/12; B60W 2710/125; B60W 2720/12; B60W 2720/14; B60W 2754/10; B60W 2754/50; B60W 30/08; B60W 30/095; B60W 30/10; B60W 30/17; B60W 30/18181; B60W 40/103; B60W 50/035; B60W 60/0018; B60W 60/00272; B60W 60/0059; B60W 2030/082; B60W 2050/0029; B60W 2050/007; B60W 2050/0082; B60W 2300/121; B60W 2420/403; B60W 2420/90; B60W 2422/00; B60W 2510/0642; B60W 2510/106; B60W 2510/285; B60W 2520/12; B60W 2530/203; B60W 2540/229; B60W 2540/26; B60W 2554/4045; B60W 2554/408; B60W 2710/0683; B60W 2710/088; B60W 2710/1033; B60W 2710/285; B60W 2720/24; B60W 30/09; B60W 30/162; B60W 40/109; B60W 40/112; B60W 40/114; B60W 50/032; B60W 60/0013; B60W 60/0015; B60W 60/0016; B60W 60/005; B60W 60/0053

See application file for complete search history.

(56) References Cited

U.S. PATENT DOCUMENTS 9,285,235 B2 *  3/2016  Ide .................... G01C 21/3617
9,626,823 B2     4/2017  Saito et al.

(56) References Cited

U.S. PATENT DOCUMENTS

| | | |
|---|---|---|
| 10,083,413 B2 | 9/2018 | Sun et al. |
| 10,467,556 B2 | 11/2019 | Klabjan |
| 2011/0193522 A1 | 8/2011 | Uesugi |
| 2012/0203726 A1* | 8/2012 | Klabjan ................. G06Q 10/06 706/46 |
| 2013/0261966 A1* | 10/2013 | Wang ................. G01C 21/3469 701/533 |
| 2015/0032516 A1 | 1/2015 | Deshpande et al. |
| 2015/0262206 A1 | 9/2015 | Dai et al. |
| 2016/0110745 A1 | 4/2016 | Iannace et al. |
| 2016/0201281 A1* | 7/2016 | Roy ........................ E02B 3/102 405/107 |
| 2017/0200103 A1* | 7/2017 | Johnson ........... G06Q 10/06313 |
| 2017/0354078 A1* | 12/2017 | Foster ................... G05D 1/0219 |
| 2020/0011687 A1* | 1/2020 | Lindemann ....... B60W 50/0098 |
| 2021/0107372 A1* | 4/2021 | Viswanathan .......... B60L 53/62 |

FOREIGN PATENT DOCUMENTS

| | | |
|---|---|---|
| WO | 2013053394 A1 | 4/2013 |
| WO | 2019126806 A1 | 6/2019 |

\* cited by examiner

INFRASTRUCTURE PLANNING TOOL

BACKGROUND

Field

This disclosure relates to a system, method, apparatus and/or device for an infrastructure planning tool for agriculture and/or other off-highway applications.

Description of the Related Art

In population areas, electrical vehicles (EV) and other zero-emission vehicles (ZEV) require infrastructure to fuel and refuel when traveling long distances on highways and other roadways. Thus, vehicle manufacturers target the sale of these EV and ZEV vehicles to areas where the necessary infrastructure to fuel and refuel are already in place or to areas where the vehicle manufacturers anticipate that the necessary infrastructure will be ready so that consumers have options to fuel and refuel their vehicles. The pre-planning of the critical infrastructure, such as charging stations to fuel and refuel these EV and ZEV vehicles, is a necessary component of the sale, management, distribution and use of these EV and ZEV vehicles. This critical infrastructure, however, is not for use by agricultural and/or other off-highway applications and uses. Moreover, this critical infrastructure does not account for different factors that apply to agricultural and/or other off-highway applications and uses. Additionally, the current infrastructure is designed and planned for the mass use of the population in a densely populated area to accommodate the needs of a dense population area, and not for individual or co-op farms.

Accordingly, there is a need for a system, apparatus and/or method to adapt the operation and planning of various critical infrastructures necessary for different powertrains for agricultural and other off-highway operations, applications and vehicles.

SUMMARY

In general, one aspect of the subject matter described in this disclosure may be embodied in an infrastructure planning tool. The infrastructure planning tool includes a navigation unit. The navigation unit is configured to determine a location of a vehicle. The infrastructure planning tool includes a processor. The processor is coupled to the navigation unit and configured to determine a route within an off-road real property area to traverse by the vehicle using the location of the vehicle over a period of time. The processor is configured to determine or estimate an amount of energy used by the vehicle to traverse the route. The processor is configured to determine a location along the route to place critical infrastructure that supports the use of the vehicle based on the amount of energy. The processor is configured to render, on a display, a graphical representation that includes the route, the off-road real property area and the location along the route to place the critical infrastructure that supports use of the vehicle.

These and other embodiments may optionally include one or more of the following features. The infrastructure planning tool may include at least one of a sensor configured to detect a weight of the vehicle or a user interface configured to receive user input. The user input may include the weight of the vehicle. The processor may be configured to determine or estimate the amount of energy used by the vehicle to traverse the route based on the weight of the vehicle.

These and other embodiments may optionally include one or more of the following features.

The infrastructure planning tool may include a sensor configured to determine a speed of the vehicle. The processor may be configured to determine or estimate the amount of energy used by the vehicle to traverse the route based on the speed of the vehicle. The infrastructure planning tool may include a sensor configured to determine a grade or incline of the route that the vehicle is to traverse. The processor may be configured to determine or estimate the amount of energy used by the vehicle to traverse the route based on the grade or the incline of the route.

The infrastructure planning tool may include a user interface. The user interface may be configured to obtain one or more parameters. The one or more parameters may include an indication of a season, a crop to be harvested or a type of a vehicle. The processor may be configured to determine the route within the off-road real property area based on the one or more parameters. The processor may be configured to determine or estimate an amount of energy used by the vehicle to traverse the route based on the one or more parameters.

The navigation unit may be configured to obtain one or more locations of existing infrastructure or objects on the off-road real property area. The processor may be configured to determine the location along the route to place critical infrastructure that supports the use of the vehicle based on the one or more locations. The processor may be configured to divide the route into multiple route segments based on the amount of energy used by the vehicle. The processor may be configured to determine the location along the route to place the critical infrastructure that supports the use of the vehicle further based on the amount of energy used for each of the multiple route segments.

The critical infrastructure may include a charging station, a fueling station or other energy station. The processor may be configured to determine the location along the route to place the critical infrastructure that supports the use of the vehicle further based on a fixed or a recurring cost of installation or use of the charging station, the fuel station or the other energy station.

In another aspect, the subject matter may be embodied in a method of planning placement of critical infrastructure. The method includes determining, by a processor, a first route within a first off-road real property and a second route within a second off-road real property. The method includes determining, by the processor, a first amount of energy used to traverse a first portion of the first route and a second amount of energy used to traverse a second portion of the second route. The method includes determining, by the processor, a first location to place a first critical infrastructure based on the first amount of energy and the second amount of energy. The method includes rendering, by the processor on a display, a graphical representation that includes the first route, the second route, the first off-road real property area, the second off-road real property area and the first location.

In another aspect, the subject matter may be embodied in an infrastructure planning tool. The infrastructure planning tool includes a user interface. The user interface has a display. The infrastructure planning tool includes a processor. The processor is coupled to the user interface and configured to determine a route to be traversed by a vehicle within an area over a period of time. The processor is configured to determine or estimate an amount of energy used by the vehicle to traverse the route. The processor is configured to determine a location along the route to place a charging or fuel station to charge or fuel the vehicle based on the amount of energy used. The processor is configured to render, on the display, a graphical representation that indicates the location along the route to place the charging or fuel station.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

Disclosed herein are systems, apparatuses, and methods for an infrastructure planning system (or "infrastructure planning tool") for agricultural and other off-highway applications to optimally place critical infrastructure on the one or more real properties. The infrastructure planning tool may be used on an off-road, off-highway or other real property, such as an individual farm, or real properties, such as a co-op farm. Through a simulated series of required activities on the agricultural or off-highway property, a user may use the infrastructure planning tool to determine optimal locations for re-fueling stations (e.g., fuel cell, hydrogen, electric, bio-mass, wind, solar or otherwise) or other critical infrastructure based on the user's specific activities and duty cycles. The various critical infrastructures may include a charging or a re-charging station, a fuel or refueling station, a maintenance shed or other structure and/or other related structures that assist the user in traversing the route. The planning tool may account for such as factors as duty cycle, total operating time, solar exposure, cost of installation of equipment, proximity to natural features and needs to exchange equipment. Many of these factors are unique and specific to agricultural and other off-highway applications, such as seasons, crops seasons, animals or other factors. This allows the user to optimally place the critical infrastructure to optimize efficiency, cost and other factors while accounting for multiple different uses of the vehicle during different seasons.

Other benefits and advantages include the capability to adapt the planning tool to manage an individual property or a co-op property. The planning tool may expand upon the consideration beyond a single property and identify locations at boundaries of a series of co-op properties in close proximity to maximize efficiencies, minimize costs and factor in other shared considerations for co-op real properties that are in close proximity and/or share a boundary.

Additionally, by pre-planning the locations and positions of the critical infrastructure for a single or for multiple properties, the planning tool may reduce down-time, duty cycle operation, and improve convenience and/or ergonomics. The planning tool may use various sensors to collect sensor data to derive the optimal location to place the critical infrastructure.

Figure 1:
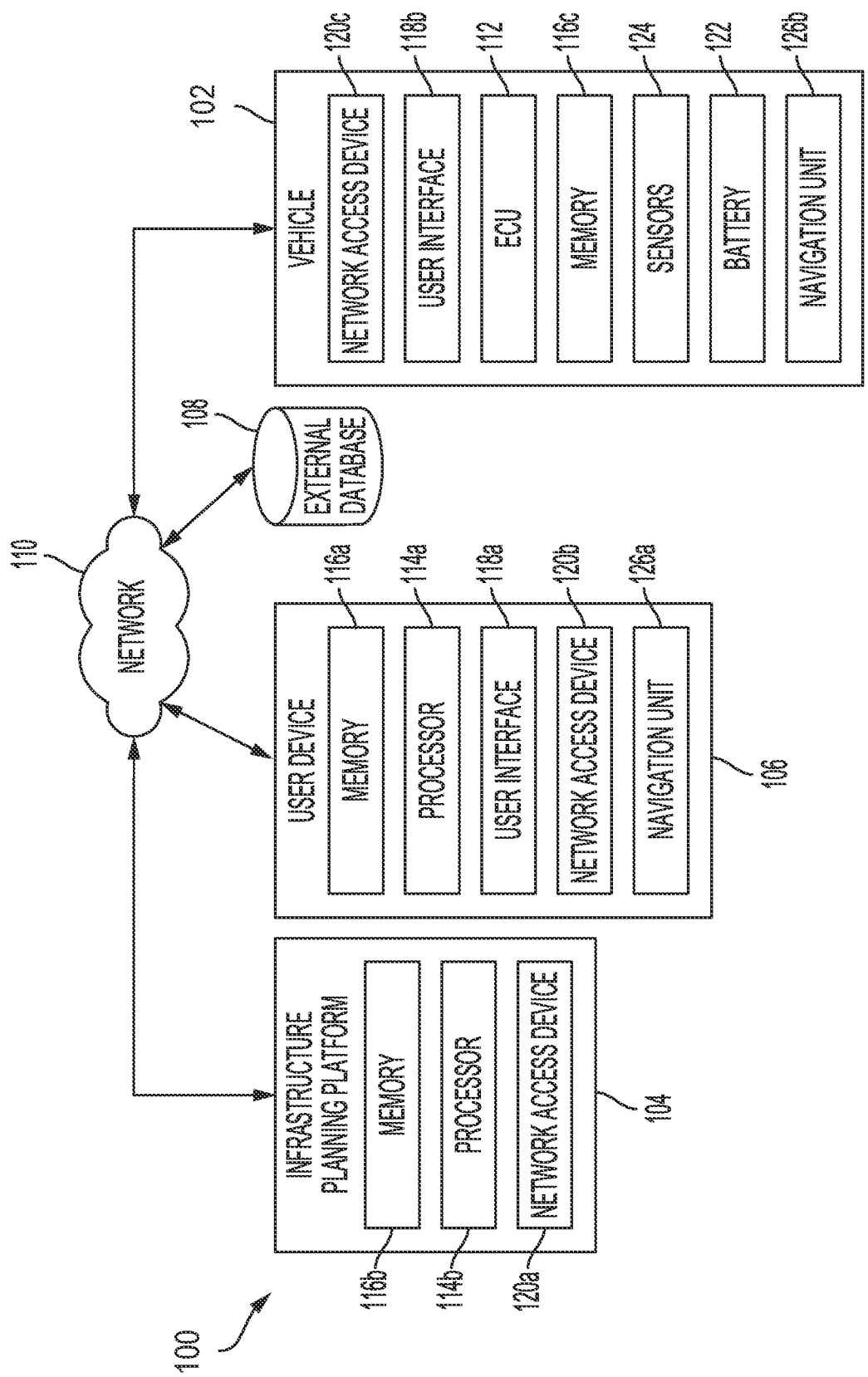
FIG. 1 is a block diagram of an infrastructure planning system according to an aspect of the invention.

FIG. 1 is a block diagram of an infrastructure planning system (or "infrastructure planning tool") 100. The infrastructure planning tool 100 or a portion thereof may be retro-fitted, coupled to, include or be included within a vehicle 102 or completely separate from the vehicle 102. The infrastructure planning tool 100 includes an infrastructure planning platform 104 and a user device 106. The infrastructure planning tool 100 may include or be coupled to an external database 108.

The infrastructure planning tool 100 may include or be coupled to a user device 106. The user device 106 may be a personal device, a mobile device, such as a smartphone, a tablet other electronic device that may display notifications, run applications or otherwise interact with the vehicle 102 via a wireless or a wired connection. The user device 106 may belong to the driver or owner of the vehicle 102 and/or a third-party.

The infrastructure planning tool 100 may have or use a network 110 to communicate among different components, such as among the vehicle 102, the user device 106, the infrastructure planning platform 104 and/or the external database 108. The network 110 may be a Dedicated Short-Range Communication (DSRC) network, a local area network (LAN), a wide area network (WAN), a cellular network, the Internet, or combination thereof, that connects, couples and/or otherwise communicates among the different components of the infrastructure planning tool 100.

The infrastructure planning tool 100 may include or be coupled to the external database 108. A database is any collection of pieces of information that is organized for search and retrieval, such as by a computer, and the database may be organized in tables, schemas, queries, reports, or any other data structures. A database may use any number of database management systems. The external database 108 may include a third-party server or website that stores or provides information. The information may include real-time information, periodically updated information, or user-inputted information. A server may be a computer in a network that is used to provide services, such as accessing files or sharing peripherals, to other computers in the network.

The external database 108 may include a map database. The map database may include map information that includes the locations of various structures or objects, such as power lines, barns, homes, maintenance sheds, roadways, property boundaries, and/or crop boundaries, which may facilitate or affect the route that a vehicle 102 traverses to harvest, plant or otherwise perform agricultural functions on the off-road or off-highway real property ("real property"), such as on a farm. The map database may also include terrain features, such as the topography of the real property, which may indicate hills, trees, slopes, the inclination of the route that is being traversed and/or other information that relates to the terrain of the real property. The map information may be provided to the user device 106 or on the one or more user interfaces 118a-b so that a user can visualize the surrounding environment and provide user input that indicates the locations of various critical infrastructure on a map of the surrounding environment.

The infrastructure planning tool 100 may include, be included within or be retro-fitted to a vehicle 102. A vehicle 102 is a conveyance capable of transporting a person, an object, or a permanently or temporarily affixed apparatus. The vehicle 102 may be a self-propelled wheeled conveyance, such as a car, a sports utility vehicle, a truck, a bus, a van or other motor, battery or fuel cell driven vehicle. For example, the vehicle 102 may be an electric vehicle, a hybrid vehicle, a hydrogen fuel cell vehicle, a plug-in hybrid vehicle or any other type of vehicle that has a fuel cell stack, a motor and/or a generator. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may have and use one or more sensors and/or a navigation unit to drive autonomously.

The infrastructure planning tool 100 includes an infrastructure planning platform 104. The infrastructure planning platform 104 may be a separate platform stored on a remote device, such as a remote server, or stored as an application within the memory 116a of the user device 106 or the memory 116c of the vehicle 102, which may be run using the processor 114a on the user device 106 or the electronic control unit (ECU) 112. When stored as an application in the memory 116a of the user device 106 of the memory 116c of the vehicle 102, the infrastructure planning tool 100 may execute the infrastructure planning platform 104 on the user device 106 or on the vehicle 102. The infrastructure planning platform 104 may map or determine the route the vehicle 102 traverses, the amount of energy the vehicle 102 used or predicted to be used along the traversed route and/or determine the one or more locations to place critical infrastructure, such as a charging station, a fuel station and/or other critical infrastructure to service or maintain the vehicle 102.

The infrastructure planning tool 100 includes one or more processors, such as the electronic control unit (ECU) 112, the processor 114a of the user device 106 and/or the processor 114b of the infrastructure planning platform 104. The one or more processors, such as the ECU 112, the processor 114a or the processor 114b, may be implemented as a single processor or as multiple processors. For example, the one or more processors may be a microprocessor, data processor, microcontroller or other controller, and may be electrically coupled to some or all the other components within the vehicle 102, the user device 106 and/or the infrastructure planning platform 104. The one or more processors may obtain sensor data and/or the current location of the vehicle 102, determine the route that the vehicle 102 is traversing and/or the energy use of the vehicle 102 while traveling the traversed route, and/or determine the placement of the critical infrastructure to support use of the vehicle 102. The one or more processors may be coupled to the one or more memories. For example, the ECU 112 is coupled to the memory 116c, the processor 114a is coupled to the memory 116a and the processor 114b is coupled to the memory 116b.

The one or more memories 116a-c may be coupled to the processors 114a-b and the ECU 112, respectively, and store instructions that the processors 114a-b and the ECU 112 executes. The one or more memories 116a-c may include one or more of a Random Access Memory (RAM), Read Only Memory (ROM) or other volatile or non-volatile memory. The memories 116a-c may be a non-transitory memory or a data storage device, such as a hard disk drive, a solid-state disk drive, a hybrid disk drive, or other appropriate data storage, and may further store machine-readable instructions, which may be loaded and executed by the processors 114a-b and/or the ECU 112. The memories 116a-c may store user configuration settings that establish the parameters of various types of vehicles, various route patterns for various seasons and/or various off-highway real properties.

The infrastructure planning tool 100 may include one or more user interfaces 118a-b, such as the user interface 118a of the user device 106 and/or the user interface 118c that may be part of the vehicle 102. The one or more user interfaces 118a-b may include an input device that receives user input from a user interface element, a button, a dial, a microphone, a keyboard, or a touch screen. The one or more user interfaces 118a-b provide an interface for a user to provide user input to indicate locations of structures, parameters to include to determine the locations to place the one or more critical infrastructures and/or one or more routes traversed by the vehicle 102. Moreover, the one or more user interfaces 118a-b may provide an output device, such as a display, a speaker, an audio and/or visual indicator, or a refreshable braille display. The one or more user interfaces 118a-b may provide the output devices, such as a display, for any notifications, warnings or alerts and/or a map of the property to show where to place the one or more critical infrastructures to the user.

The infrastructure planning tool 100 includes one or more network access devices 120a-c. The one or more network access devices 120a-c, such as the network access device 120a of the infrastructure planning platform 104, the network access device 120b of the user device 106 and/or the network access device 120c of the vehicle 102, may include a communication port or channel, such as one or more of a Dedicated Short-Range Communication (DSRC) unit, a Wi-Fi unit, a Bluetooth® unit, a radio frequency identification (RFID) tag or reader, or a cellular network unit for accessing a cellular network (such as 3G, 4G or 5G). The network access devices 120a-c may transmit data to and receive data from the different components of the different entities of the infrastructure planning tool 100, such as the user device 106, the vehicle 102, and/or the infrastructure planning platform 104.

The infrastructure planning tool 100 may include one or more navigation units 126a-b. The navigation unit 126b may be integral to the vehicle 102 or a separate unit, such as navigation unit 126a that is part of the user device 106 and which may be coupled to the vehicle 102. The vehicle 102 may include a Global Positioning System (GPS) unit (not shown) for detecting location data including a current location of the vehicle 102 and date/time information instead of the navigation unit 126b. The current location of the vehicle 102 and/or the date/time information may be used to indicate when the vehicle 102 is within the boundaries of the property and/or may be used to calculate the speed of the vehicle 102. The current location may also be used to determine the route of the vehicle 102 and/or determine where the vehicle 102 is along the route that is being traversed. In some implementations, the ECU 112 may perform the functions of the navigation unit 126b based on data received from the GPS unit. The navigation unit 126b or the ECU 112 may perform navigation functions. Navigation functions may include, for example, route and route set prediction, providing navigation instructions, and receiving user input such as verification of predicted routes and route sets or destinations.

The one or more navigation units 126a-b may be used to obtain navigational map information. The navigational map information may include the current location of the vehicle 102 and/or map information that includes the locations of one or more structures, the locations of the one or more terrain features and/or other information, such as map information that indicates the locations, grade or other attributes of the property.

The infrastructure planning tool 100 may include or be coupled to one or more vehicle components. The one or more vehicle components may include the battery 122 or other energy generation device, such as an engine (not shown) or a fuel cell stack (not shown). The battery 122 may supply electrical energy to and receive electrical energy to power the vehicle 102. The battery 122 may include one or more rechargeable batteries. The engine may combust fuel to provide power instead of and/or in addition to the power supplied by the battery 122. The infrastructure planning tool 100 may measure the statue of charge, power generation and/or usage to determine the energy efficiency of the vehicle 102 as the vehicle 102 traverses along the route.

The one or more vehicle components may include one or more sensors 124. The one or more sensors 124 may include a vehicle speed sensor, a battery sensor, an engine sensor and/or other sensor. The other sensor may be an inclinometer, for example. The inclinometer may measure a grade or level of incline of the portion of the route that the vehicle 102 is traversing. The vehicle speed sensor may measure or detect a measure or speed of the vehicle 102. The battery sensor may measure or detect a state of charge of the battery 122. The battery sensor may measure or detect an amount of energy discharged from the battery 122 to power the vehicle 102 along the portion of the route. The engine sensor may measure or detect an amount of fuel or air injected into the engine of the vehicle 102. The various sensor data measured or detected by the one or more sensors 124 may be used to determine the amount of energy used by the vehicle 102 to traverse a portion of the route that the vehicle 102.

The one or more sensors 124 may include other sensors. The other sensors may include a camera, LIDAR, radar, infrared, or other signal to detect one or more objects or detect other attributes or characteristics of the surrounding environment. The one or more sensors 124 may be positioned on the outside frame of the vehicle 102 to determine the existence and locations of various structures, such as a shed, barn, power line, fence or other structure that is on or within the boundary of the property. The detection of these objects, attributes or characteristics of the surrounding environment may assist in the identification of places to locate critical infrastructure.

Figure 2:
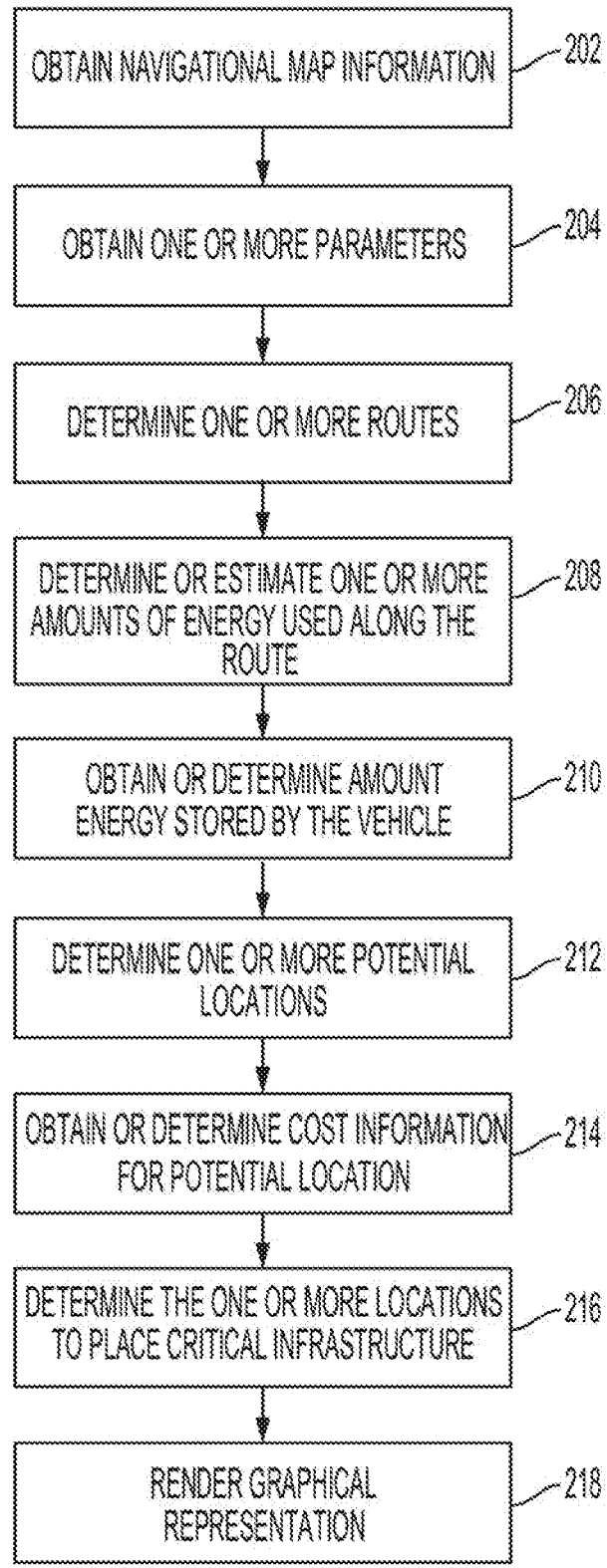
FIG. 2 is a flow diagram of an example process for providing a user with a graphical representation of the property with one or more locations of one or more critical infrastructures using the infrastructure planning system of FIG. 1 according to an aspect of the invention.
Figure 4:
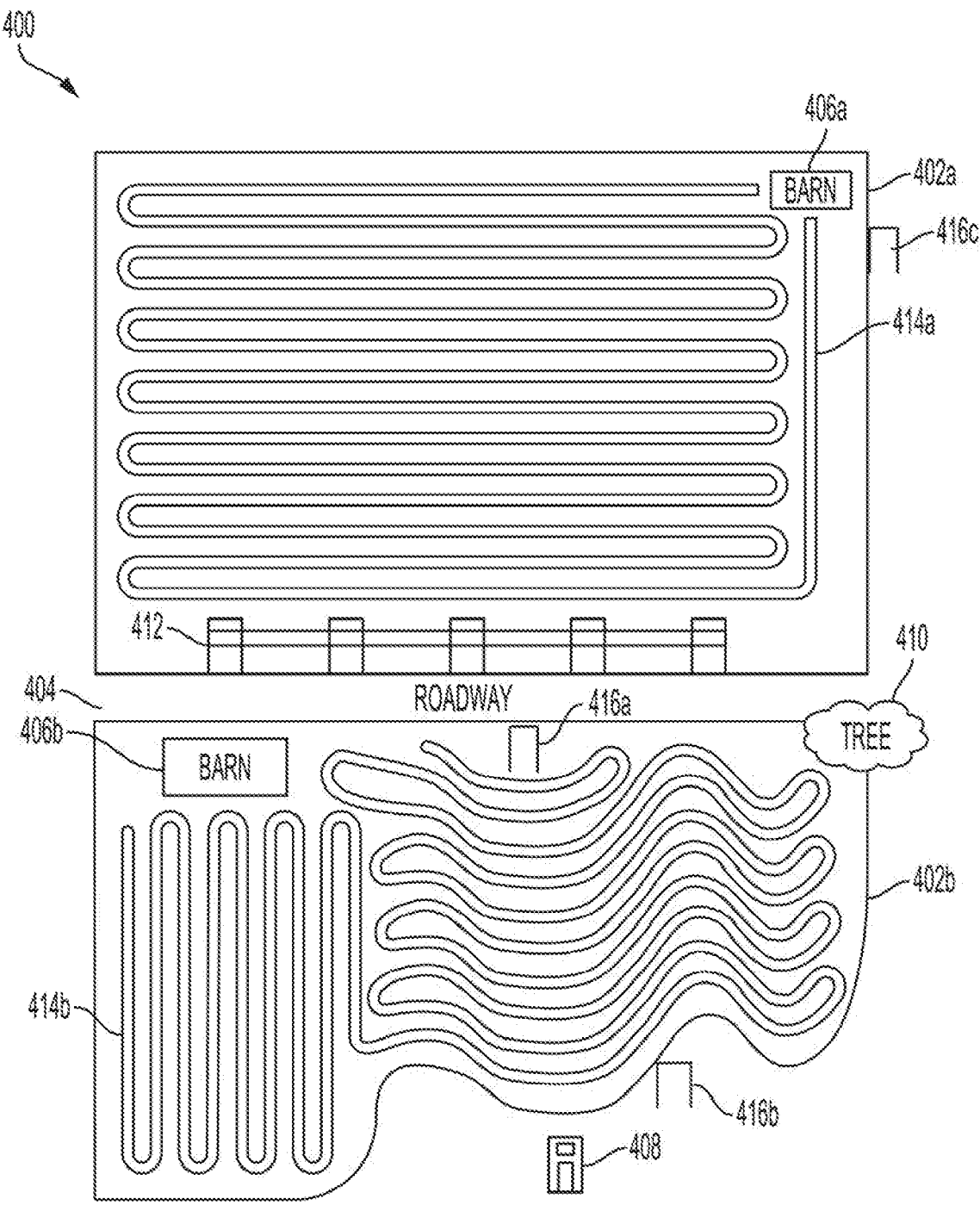
FIG. 4 shows an example graphical representation of multiple real properties displayed using the infrastructure planning system of FIG. 1 according to an aspect of the invention.

FIG. 2 is a flow diagram of a process 200 for providing a user with a graphical representation of the property with one or more locations of one or more critical infrastructures. One or more computers or one or more data processing apparatuses, for example, the one or more processors 114a-b or the ECU 112 of the infrastructure planning tool 100 of FIG. 1, appropriately programmed, may implement the process 200. The infrastructure planning tool 100 may be used to map or determine the placement of critical infrastructure for a single individual real property area or for multiple real properties, such as the real properties 402a-b, as shown in FIG. 4 for example. FIG. 4 shows an example graphical representation 400 that is rendered on the display of the infrastructure planning tool 100.

The multiple real properties 402a-b may be adjacent to one another and share a common boundary, such as the roadway 404. The infrastructure planning tool 100 allows owners or users of the various real properties 402a-b of a co-op farming community to pool or share critical infrastructure to more efficiently use the critical infrastructure and minimize cost.

The infrastructure planning tool 100 obtains the navigational map information (202). The navigational map information may include map information, the current location of the vehicle 102 and/or a date/time. The infrastructure planning tool 100 may extract the map information and/or the current location of the vehicle 102 from the navigational map information. The infrastructure planning tool 100 may use the navigation unit 126a-b to obtain the navigational map information. For example, the infrastructure planning tool 100 may determine the current location using the navigation unit 126a-b, provide the current location to the external database 108 and obtain the map information of the area surrounding the current location of the vehicle 102 from the external database 108. In another example, the navigation unit 126a-b obtains the entirety of the navigational map information including the current location of the vehicle 102 and/or the map information.

When there are multiple real properties, such as for a co-op farm, the infrastructure planning tool 100 may obtain the navigational map information for the multiple real properties. The infrastructure planning tool 100 may either use the current location of multiple vehicles traversing different routes on the different real properties or the current location of a single vehicle traversing different routes on the different real properties at different times. Similarly, the infrastructure planning tool 100 may obtain the map information for the multiple real properties including the locations of one or more structures or objects, such as the barns 406a-b, the roadway 404, the restroom 408, a tree 410 and/or one or more public utilities 412, and/or the locations of the one or more terrain features. The map information may be obtained via user input and/or via the navigational map information obtained from the navigation unit 126a-b or from the external database 108.

In some implementations, the portions of the navigational map information may be obtained from user input through the one or more user interfaces 118a-b. The infrastructure planning tool 100 may receive user input that indicates one or more preferred locations that the user would like to place the critical infrastructure near. The one or more preferred locations may be used to determine or select the one or more locations to place the critical infrastructure.

The infrastructure planning tool 100 may obtain one or more parameters (204). The infrastructure planning tool 100 may obtain the one or more parameters using the one or more user interfaces 118a-b. The one or more parameters may be related to the route that the vehicle 102 or another vehicle is to traverse, such as the route 414a on the real property 402a and the route 414b on the real property 402b.

The one or more parameters may include the type or kind of vehicle 102 that is being used to traverse the route or is to be used to traverse the route. The one or more parameters may include other characteristics of the vehicle 102, such as the weight or mass of the vehicle 102 including any attached equipment. The weight or mass of the vehicle 102 may be stored within one of the one or more memories 116a-c, user-inputted through the one or more user interfaces 118a-b and/or detected or measured by one or more sensors 124. In some implementations, the weight or mass of the vehicle 102 may be hard-coded into the instructions of the one or more processor 114a-b or the ECU 112.

The one or more parameters may include a time of year, a season of the year, a crop to be planted or harvested, and/or other information related to the vehicle 102, such as an additional or alternative energy generation device, the route of the vehicle 102 and/or the real property 402a-b. The one or more parameters may include the locations of one or more structures where the user may desire to rest or stop the vehicle 102 to perform an errand or other maintenance and/or one or more other preferred locations where the user would like to place the critical infrastructure.

In some implementations, the infrastructure planning tool 100 may use one or more sensors 124, such as a camera, to determine the one or more parameters. For example, the infrastructure planning tool 100 may use the camera to capture image data, and then, analyze the captured image data using artificial intelligence to determine the crop that is being planted or harvested from the image data.

The infrastructure planning tool 100 obtains or determines one or more routes (206). The infrastructure planning tool 100 may receive the one or more routes that the vehicle 102 is to traverse. The infrastructure planning tool 100 may receive the one or more routes via user input from one of the user interfaces 118a-b. For example, the infrastructure planning tool 100 may receive a start location, a destination location and various waypoints in between the start location and the destination location to generate or form a route in between the start location and the destination location. In some implementations, the infrastructure planning tool 100 may map the location of the vehicle 102 over a period of time, such as from when the vehicle 102 is initialized to when the vehicle 102 is turned off to determine the one or more routes. The mapped location over the period of time may indicate the route that the vehicle 102 traversed, which may be stored in one or more of the memories 116a-c to be used later as the route that the vehicle 102 is to traverse. For example, the vehicle 102 or another vehicle may traverse the route around the property and the infrastructure planning tool 100 may simultaneously record and store the route that the vehicle 102 or other vehicle traverses to determine the one or more routes.

In some implementations, the infrastructure planning tool 100 may determine the one or more routes based on the one or more parameters. For example, the infrastructure planning tool 100 may have previously stored one or more routes in the one or more memories 116a-c. The one or more routes may be associated with the time of year, a particular crop and/or a particular season of the year. The infrastructure planning tool 100 may receive user input including one or more parameters that indicate the time of year, the particular crop and/or the particular season of the year of which the user intends to use the infrastructure planning tool 100 to plan. In response, the infrastructure planning tool 100 may obtain the one or more routes associated with the time of year, the particular crop and/or the particular season from the one or more memories 116a-c.

The infrastructure planning tool 100 may account for the various parameters when determining the one or more routes. For example, the vehicle 102 or other vehicle may traverse different routes when harvesting and planting different crops in different seasons of the year. The crops may also be located in different sections of the real property. Moreover, different vehicles may be used to plant and/or harvest the different crops, such as potatoes versus wheat, and thus, the infrastructure planning tool 100 needs to account for the different seasons of harvest and planting, the different types of vehicles used to harvest and/or plant along with the different routes within the various sections of the real property where the crops are located.

Figure 5:
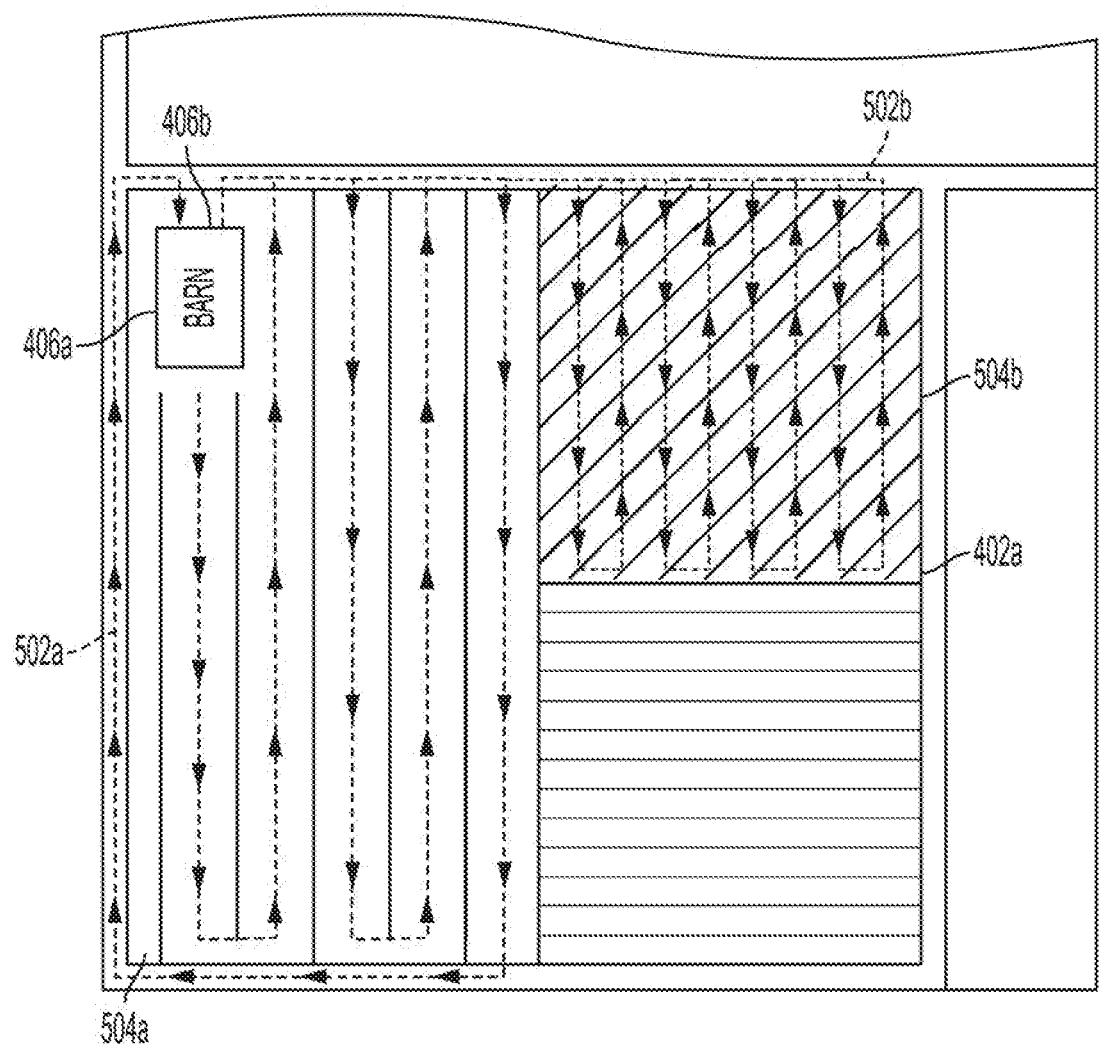
FIG. 5 shows an example graphical representation of a real property with multiple routes for one or more vehicles to farm various crops using the infrastructure planning system of FIG. 1 according to an aspect of the invention.

For example, as shown in FIG. 5, the real property 402a may be divided to harvest and plant various crops. One portion of the real property 402a may be designated to harvest and plant wheat, such as the wheat section 504a of the real property 402a. Another portion of the real property 402a may be designated to harvest and plant potatoes, such as the potatoes section 504b. Thus, the route 502a that the vehicle 102 traverses to harvest the wheat in the wheat section 504a may be different than the route 502b that the vehicle 102 or other vehicle traverses to harvest the potatoes in the potatoes section 504b. Since the potatoes are planted in the winter and harvested in mid-spring, whereas wheat is planted in autumn and harvested in the summer, the infrastructure planning tool 100 must ensure that the critical infrastructures support the one or more vehicles used to harvest and plant both crops in the different sections 504a-b of the real property 402a.

The infrastructure planning tool 100 determines or estimates one or more amounts of energy used along the one or more routes (208). The infrastructure planning tool 100 may use one or more sensors 124 to measure or determine the amount of energy used by the vehicle 102 to traverse the one or more routes. For example, as the vehicle 102 traverses along one of or along each of the one or more routes, such as the route 414a or the route 414b, the infrastructure planning tool 100 uses the one or more sensors 124 to measure the amount of energy used by the vehicle 102. The infrastructure planning tool 100 may associate the amount of energy used by the vehicle 102 along each portion of the traversed route, e.g., by using the current location and/or the one or more parameters to define the portion or subset of the traversed route that is associated with the amount of energy used.

The infrastructure planning tool 100 may determine or estimate the one or more amounts of energy used based on the one or more parameters, such as the weight or speed of the vehicle 102 and/or the grade or level of incline of the portion of the route. The amount of energy used may be representative of the amount of energy used along the entire route, along various portions of the route and/or an instantaneous measurement of the amount of energy used for the current location of the vehicle 102.

Figure 3:
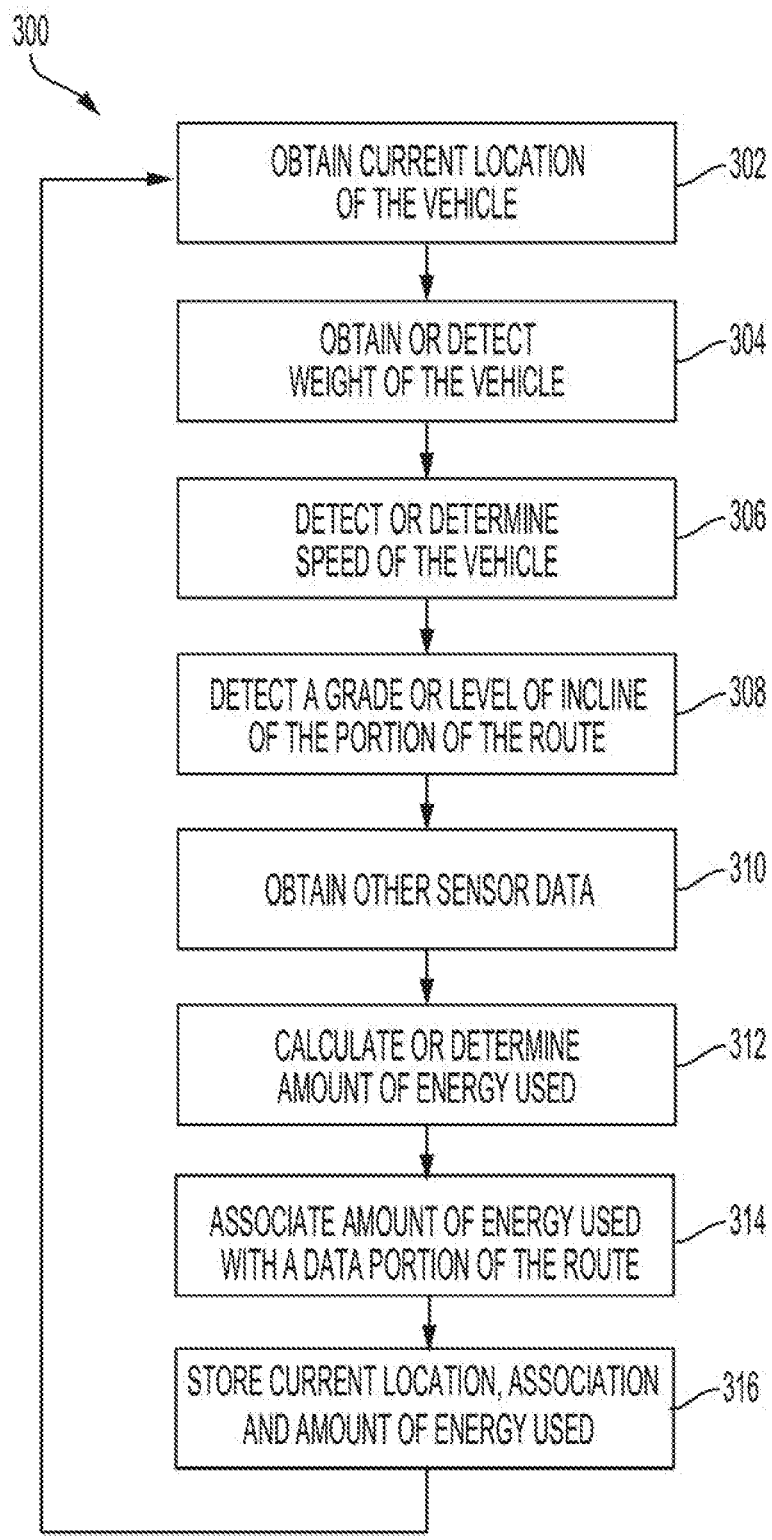
FIG. 3 is a flow diagram of an example process for determining the amount of energy used along each portion of the traversed route using the infrastructure planning system of FIG. 1 according to an aspect of the invention.

In some implementations, the infrastructure planning tool 100 may determine or estimate an instantaneous measurement of the amount of energy used at multiple locations to calculate the amount of energy used along the entire route or along various portions of the route. In some implementations, the infrastructure planning tool 100 may determine or estimate the amount of energy used along the entire route to calculate the amount of energy used along various portions of the route. FIG. 3 further describes the process for determining the amount of energy used along each portion of the traversed route.

Once the infrastructure planning tool 100 determines or estimates the one or more amounts of energy used, the infrastructure planning tool 100 obtains or determines the amount of energy stored by the vehicle 102 (210). The amount of energy stored by the vehicle 102 may be based on the type or kind of the vehicle 102 and be different for various types or kinds of vehicle. For example, a vehicle that harvests or plants wheat may have more stored energy than the vehicle that harvests or plants potatoes.

The infrastructure planning tool 100 may determine the type or kind of the vehicle 102 from the one or more parameters previously obtained, such as the type of crop to be harvested. The infrastructure planning tool 100 may map the type or kind of the vehicle 102 to a value that represents the amount of energy stored by the vehicle 102. The mapping with the relationship between the type or kind of the vehicle 102 to the value that represents the amount of energy stored by the vehicle 102 may be stored within the one or more memories 116*a-c*. In some implementations, the infrastructure planning tool 100 may query the external database 108 with the type or kind of the vehicle 102 to obtain the amount of energy stored by the type or kind of the vehicle 102.

The amount of energy stored by the vehicle 102 may also be affected by one or more energy generation devices included or coupled to the vehicle 102. For example, a solar generation device or a regenerative braking device may be included or coupled to the vehicle 102, which would increase the amount of energy stored within the vehicle 102. And so, the infrastructure planning tool 100 may estimate an additional amount of energy stored for any vehicle that includes or is coupled to one or more energy generation devices.

Once the amount of energy stored by the type or kind of the vehicle 102 is obtained or determined, the infrastructure planning tool 100 determines the one or more potential locations to place the critical infrastructure (212). The infrastructure planning tool 100 may determine the one or more locations to place the critical infrastructure, such as the charging or fueling station, based on the amount of energy stored by the type or kind of the vehicle 102 and the amount of energy used along various portions of the route and/or the amount of energy used along the entire route.

The infrastructure planning tool 100 determines the distance that the vehicle 102 may travel along the route until the amount of energy stored by the type or kind of the vehicle 102 is depleted based on the amount of energy stored in the vehicle 102 and the amount of energy used for each portion of the route and/or the amount of energy used for the entire route. The distance may be estimated and include a safety margin. The infrastructure planning tool 100 may determine the distance where the amount of energy stored in the vehicle 102 is depleted for each of the one or more routes, which may be different for the different seasons of the year or crops. The infrastructure planning tool 100 may select the shortest distance among the determined distances as the distance the vehicle 102 could travel before depleting the amount of energy stored to the safety margin.

For example, the infrastructure planning tool 100 may identify the location where the limit, e.g., where the amount of stored energy would be depleted to the safety margin, is reached from a starting location as the first potential location to place the critical infrastructure. Once the first potential location is identified, the infrastructure planning tool 100 may similarly calculate the next potential location and subsequent potential locations in the same manner. The infrastructure planning tool identifies the subsequent potential locations where the limit is reached if the vehicle 102 was to refuel or recharge at the previous potential location along the route.

The infrastructure planning tool 100 may obtain or determine the cost information associated with each of the one or more potential locations (214). The cost information may include the fixed and/or the recurring cost to place the critical infrastructure at the potential location. For example, for a charging station, the cost information may include the cost of the installation and maintenance of the charging station and/or transformer and also the cost of the installation and maintenance of the high voltage cables that connect the charging station and/or transformer with a power source, such as the one or more public utilities 412. When the charging station is placed farther away from the one or more public utilities 412, underground cables may be necessary to connect with the one or more public utilities 412, and so, the cost information may include the cost of installing and maintaining the underground cables from one or more potential locations along the routes 414*a-b*. In another example, for a hydrogen fueling station, the cost information may include the cost of the installation and maintenance of the hydrogen fueling station and also any costs associated with refueling the hydrogen fueling station. When the hydrogen fueling station is placed away from the roadway 404, the cost of the hydrogen fueling station may include the cost of building and maintaining an additional roadway that leads from the roadway 404 to the one or more potential locations. The infrastructure planning tool 100 may obtain the cost information from the external database 108 or may be user-inputted.

The cost information for each of the one or more potential locations may be reduced when two or more potential locations are within a threshold distance of each other, such as within 50-100 feet, because only a single critical infrastructure may be needed to service the vehicle 102 when the vehicle 102 is at or in proximity to the two or more potential locations that are within the threshold distance. Essentially, the vehicle 102 may be able to use the same critical infrastructure for the two or more potential locations along the route, and thus, an additional critical infrastructure may not be necessary when the two or more potential locations are within the threshold distance, and so, the two or more potential locations share the same cost for the critical infrastructure.

Once the one or more potential locations are determined, the infrastructure planning tool 100 may determine the one or more locations to place the critical infrastructure (216). The determination may be based on the one or more potential locations, the cost information and/or the locations of various structures or objects, which may facilitate the use and/or performance of the off-road, off-highway or agricultural activity or use of the real property. The infrastructure planning tool 100 identifies a location within a threshold distance of the one or more potential locations, such as within approximately fifty to a hundred feet of the one or more potential locations, as the location to place the critical infrastructure. When there are multiple potential locations within a vicinity of each other, the infrastructure planning tool 100 may identify a location within the threshold distance of the multiple potential locations to minimize the number of critical infrastructures needed to be built.

When determining the one or more locations, the infrastructure planning tool 100 may account for the cost information, the one or more preferred locations, and/or the locations of various structures or objects. For example, the infrastructure planning tool 100 may choose a location that is closer to a location of a preferred location or a location of a particular structure, such as one or more public utilities 412, the roadway 404, the barn 406*a-b* or other structure to reduce the fixed and/or recurring costs of the critical infrastructure. In another example, the infrastructure planning tool 100 may choose a location that is closer to a location of a particular structure, such as a restroom 408 or a tree 410 where the user may rest while the vehicle 102 is being charged, refueled or otherwise maintained.

Once the infrastructure planning tool 100 is finished determining the one or more locations, the infrastructure planning tool renders a graphical representation (218). The infrastructure planning tool 100 may render the graphical representation on the one or more user interfaces 118a-b, such as the graphical representation 400 as shown in FIG. 4, to display the one or more locations to place the critical infrastructure, the route, the real property and/or one or more other structures on the real property.

The graphical representation 400 shows multiple real properties 402a-b and the corresponding locations to place the critical infrastructures 416a-c. The real properties 402a-b may represent a co-op farming community that includes multiple individual farms, agricultural areas or off-highway or off-road real properties. The multiple real properties 402a-b may include any number of real properties 402a-b that are each representative of an individual farm. The graphical representation 400 includes the multiple real properties 402a-b, one or more shared boundaries, such as along the roadway 404, the locations of one or more structures or objects, such as the barn 406a-b, the restroom 408, the tree 410 and/or one or more public utilities 412, and the locations of the one or more critical infrastructures 416a-c. The graphical representation 400 may also include the one or more routes 414a-b that the vehicle 102 or other vehicle traverses. This allows the user to visualize the one or more locations to place the critical infrastructure 416a-c on the real property.

In one example, the one or more locations to place the critical infrastructure 416a-c may be on the shared boundary, such as along the roadway 404, so that a vehicle 102 traveling on either route 414a-b may use the shared critical infrastructure 416a. Moreover, the shared critical infrastructure 416a is near or in proximity to the one or more public utilities 412 and/or has access to the roadway 404 so that re-filling the shared critical infrastructure 416a would cost less. For example, there would be less cables necessary to deliver the energy from the public utility to the critical infrastructure, such as a charging station, or no need for an additional roadway to refuel the critical infrastructure, such as a hydrogen or natural gas fueling station, which results in less cost to deliver the fuel or energy to the critical infrastructure. This would save installation and maintenance costs as multiple owners could share the cost of installing and maintaining the critical infrastructure. In another example, the one or more locations to place the critical infrastructure 416a-c may be near the barn 406a or near the restroom 408 so that an operator of the vehicle 102 could use the facilities to rest while re-fueling or re-charging the vehicle 102.

FIG. 3 is a flow diagram of a process 300 for determining the amount of energy used along each portion of the traversed route. One or more computers or one or more data processing apparatuses, for example, the one or more processors 114a-b or the ECU 112 of the infrastructure planning tool 100 of FIG. 1, appropriately programmed, may implement the process 300.

The infrastructure planning tool 100 obtains a current location of the vehicle 102 (302). The infrastructure planning tool 100 may obtain the current location by extracting the current location from the navigational map information that was obtained, as described above. The current location of the vehicle 102 may be associated with a starting location of the portion of the route of the vehicle 102. Once the starting location of the portion of the route is identified, the infrastructure planning tool 100 measures, detects or obtains one or more parameters to determine the amount of energy used to traverse the portion of the route.

The infrastructure planning tool 100 may obtain or detect the weight of the vehicle 102 (304). The infrastructure planning tool 100 may receive the weight of the vehicle 102 via user input from the one or more user interfaces 118a-b. In some implementations, the infrastructure planning tool 100 obtains a parameter, such as the type or kind of vehicle 102, and uses a mapping stored in the one or more memories 116a-c to map the type or kind of vehicle 102 to a corresponding weight of the vehicle 102, and obtains the corresponding weight of the vehicle 102 from the one or more memories 116a-c. In some implementations, the infrastructure planning tool 100 uses one or more sensors 124, such as a weight or pressure sensor, to obtain the weight of the vehicle 102 including any devices that are attached. The weight may be one factor used to calculate the amount of energy used to traverse the portion of the route.

The infrastructure planning tool 100 may detect or determine the speed of the vehicle 102 as the vehicle 102 traverses the portion of the route (306). The infrastructure planning tool 100 may use one or more sensors 124, such as a vehicle speed sensor, to measure or detect the speed of the vehicle 102. The speed may be measured or detected over a period of time and averaged over the portion of the route or may be an instantaneous speed at the location. The speed may also be a factor used to calculate the amount of energy used to traverse the portion of the route.

The infrastructure planning tool 100 may detect a grade or a level of incline of the portion of the route (308). The infrastructure planning tool 100 may use one or more sensors 124, such as an inclinometer, to measure or detect the grade or level of the incline of the portion of the route that the vehicle 102 is traversing. The grade or level of incline of the portion of the route may be a factor in determining the amount of energy used to traverse the portion of the route.

The infrastructure planning tool 100 may obtain other sensor data to calculate or otherwise determine the amount of energy used (310). The other sensor data may include the state of charge of the battery 122, the amount of fuel or air injected into the engine or other sensor data that relates to the vehicle 102. The infrastructure planning tool 100 may use one or more sensors to collect the other sensor data. For example, the infrastructure planning tool may use a battery sensor to detect the state of charge of the battery 122 and the change in the state of charge of the battery 122 and/or a throttle or engine sensor to detect the amount or change in the amount of fuel or air injected into the engine.

Once the weight, the speed, the grade or level of the incline and/or the other sensor data are obtained or determined, the infrastructure planning tool 100 calculates or otherwise determines the amount of energy used (312). The amount of energy used may be based on the weight, the speed and/or the grade or level of the incline. The increase or decrease of the amount of energy used may be proportional to the increase or decrease, respectively, of the weight, the speed and/or the grade or the level of the incline.

For example, as the weight of the vehicle 102 increases, the amount of energy used to move the vehicle 102 also increases, and correspondingly, as the weight of the vehicle 102 decreases, the amount of energy used to move the vehicle 102 also decreases. In another example, as the speed of the vehicle 102 increases, the amount of energy used to move the vehicle 102 also increases, and correspondingly, as the speed of the vehicle 102 decreases, the amount of energy used to move the vehicle 102 also decreases. Similarly, in another example, as the grade or the level of the incline of the portion of the route increases, the amount of energy used to move the vehicle 102 also increases, and correspondingly, as the grade or the level of the incline of the portion of the route decreases, the amount of energy used to move the vehicle 102 also decreases. As such, the infrastructure planning tool 100 may determine the amount of energy used for the portion of the route based on the weight of the vehicle 102, the speed of the vehicle 102 as the vehicle 102 traverses the portion of the route, and/or the grade or the level of the incline of the portion of the route.

The infrastructure planning tool 100 associates the calculated or determined amount of energy used with the portion of the route within a threshold distance of the current location of the vehicle 102 (314). The infrastructure planning tool 100 stores the current location of the vehicle 102, which is representative of the portion of the route that the vehicle 102 is traversing, the association and the calculated or determined amount of energy used with the portion of the route into the one or more memories 116a-c (316). This allows the infrastructure planning tool 100 to refer to the amount of energy used for the portion of the route to later determine the one or more locations to place the critical infrastructure.

Once the amount of energy used is calculated or determined for a first portion, the infrastructure planning tool 100 repeats the collection of the sensor data, such as the weight, the speed, the grade or the level of the incline and/or the other sensor data, the infrastructure planning tool 100 and calculates or determines the amount of energy used for a second portion of the route. The infrastructure planning tool continues to collect the sensor data and calculates or determines the amount of energy used for another portion of the route until the amount of energy used is calculated or determined for the entire route. By dividing and/or segmenting the entire route into segments, the infrastructure planning tool is able to calculate or determine the amount of energy used more accurately for each portion of the entire route, which provides for a more accurate calculation or determination of the amount of energy used through each portion of the entire route.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An infrastructure planning tool, comprising:
a processor in data communication with a navigation system and configured to:
determine, based on a plurality of locations of a vehicle detected via the navigation system over a period of time, (ii) one or more types of agricultural work to be performed, and (iii) a time or season in a year associated with at least one of the one or more types of agricultural work to be performed, a first route within a first off-road real property and a second route within a second off-road real property, at least one of the first off-road real property or the second off-road real property being where the at least one of the one or more types of agricultural work is to be performed,
determine or estimate a first amount of energy required by the vehicle to traverse the first route and a second amount of energy required by the vehicle to traverse the second route,
determine, based on the first and the second amounts of energy required by the vehicle, at least one location along at least one of the first route or the second route to place a number of infrastructures that provide a service required for an operation of the vehicle on the first and the second routes, the operation of the vehicle including performance of the at least one of the one or more types of agricultural work, and
cause a graphical representation that includes the first and the second routes, the first and the second off-road real properties, and the determined at least one location along the at least one of the first route or the second route to be rendered on a display in data communication with the processor.

2. The infrastructure planning tool of claim 1, further comprising:
at least one of a sensor configured to detect a weight of the vehicle, a user interface configured to receive user input that indicates the weight of the vehicle, or a memory that is configured to store the weight of the vehicle; and
wherein the processor is in data communication with the at least one of the sensor, the user interface, or the memory and further configured to determine or estimate, based on the weight of the vehicle, the first and the second amounts of energy required by the vehicle.

3. The infrastructure planning tool of claim 1, further comprising:
a sensor configured to determine a speed of the vehicle; and
wherein the processor is in data communication with the sensor and further configured to determine or estimate, based on the speed of the vehicle, the first and the second amounts of energy required by the vehicle.

4. The infrastructure planning tool of claim 1, further comprising:
a sensor configured to determine a grade or incline of the first route or the second route; and
wherein the processor is in data communication with the sensor and further configured to determine or estimate, based on the respective grade or incline of the first route or the second route, the first amount of energy or the second amount of energy required by the vehicle.

5. The infrastructure planning tool of claim 1, further comprising:
a user interface or a camera configured to obtain one or more parameters including an indication of a season within a year, a crop to be harvested, or a type of vehicle; and
wherein the processor is in data communication with the user interface or the camera and further configured to:
determine, based on the one or more parameters, the first route or the second route,
and
determine or estimate, based on the one or more parameters, the first amount of energy or the second amount of energy required by the vehicle.

6. The infrastructure planning tool of claim 1, further comprising:
a user interface configured to receive data indicative of one or more preferred locations of one or more of the infrastructures; and
wherein the processor is in data communication with the user interface and further configured to:

obtain one or more locations of existing infrastructures or objects, and determine, based further on the one or more locations of the existing infrastructures or objects or the one or more preferred locations, the at least one location to place the number of infrastructures.

7. The infrastructure planning tool of claim 1, wherein the processor is further configured to:

divide the first route or the second route into a plurality of route segments based on, respectively, the first amount of energy or the second amount of energy required by the vehicle.

8. The infrastructure planning tool of claim 7, wherein the processor is further configured to:

determine, based further on an amount of energy required by the vehicle for each of the plurality of route segments, the at least one location to place the number of infrastructures.

9. The infrastructure planning tool of claim 1, wherein the number of infrastructures include a charging station, a fuel station, or other energy station, and wherein the processor is further configured to determine, based further on a fixed or a recurring cost of installation or use of the charging station, the fuel station, or the other energy station, the at least one location to place the number of infrastructures.

10. A method of planning placement of infrastructure, comprising:

determining, by a processor and based on a plurality of locations of a vehicle detected over a period of time via a navigation system coupled to the processor, (ii) one or more types of agricultural work to be performed, and (iii) a time or season in a year associated with at least one of the one or more types of agricultural work to be performed, a first route within a first off-road real property and a second route within a second off-road real property, at least one of the first off-road real property or the second off-road real property being where the at least one of the one or more types of agricultural work is to be performed;

determining, by the processor, a first amount of energy required by the vehicle to traverse a first portion of the first route and a second amount of energy required by the vehicle to traverse a second portion of the second route;

determining, by the processor and based on the first and the second amounts of energy required by the vehicle, at least one location along at least one of the first route or the second route to place a number of infrastructures that provide a service required for an operation of the vehicle on the first and the second routes, the operation of the vehicle including performance of the at least one of the one or more types of agricultural work; and rendering, by the processor and on a display coupled to the processor, a graphical representation that includes the first route, the second route, the first off-road real property, the second off-road real property, and the determined at least one location along the at least one of the first route or the second route.

11. The method of claim 10, wherein the first off-road real property and the second off-road real property are adjacent and share at least one boundary.

12. The method of claim 11, wherein at least one of the determined at least one location is on the at least one shared boundary.

13. The method of claim 10, wherein:

the determined at least one location includes a first location and a second location, the first location is on or in proximity to the first route and the second location is on or in proximity to the second route, and the graphical representation further includes the first location and the second location.

14. The method of claim 10, further comprising:

obtaining one or more locations of existing infrastructures or objects on the first off-road real property or the second off-road real property; and wherein the determining of the at least one location is further based on the one or more locations of the existing infrastructures or objects.

15. An infrastructure planning tool, comprising:

a user interface having a display; and a processor coupled to the user interface and configured to:

determine, based on (i) one or more types of agricultural work to be performed and (ii) a time or season in a year associated with at least one of the one or more types of agricultural work to be performed, a first route within a first off-road real property and a second route within a second off-road real property, the first and the second routes to be traversed by a vehicle over a period of time, at least one of the first off-road real property or the second off-road real property being where the at least one of the one or more types of agricultural work is to be performed, determine or estimate a first amount of energy required by the vehicle to traverse the first route and a second amount of energy required by the vehicle to traverse the second route, determine, based on the first and the second amounts of energy required by the vehicle, at least one location along at least one of the first route or the second route to place a number of charging or fuel stations to charge or fuel the vehicle, and render, on the display, a graphical representation that indicates the at least one location to place the number of charging or fuel stations.

16. The infrastructure planning tool of claim 15, further comprising:

a sensor configured to detect a weight of the vehicle; and wherein the processor is in data communication with the sensor and further configured to determine or estimate, based on the weight of the vehicle, the first and the second amounts of energy required by the vehicle.

17. The infrastructure planning tool of claim 15, further comprising:

a sensor configured to determine a grade or incline of the first route or the second route; and wherein the processor is in data communication with the sensor and further configured to determine or estimate, based on the respective grade or incline of the first route or the second route, the first amount of energy or the second amount of energy required by the vehicle.

18. The infrastructure planning tool of claim 15, further comprising:

a second user interface configured to obtain one or more parameters including an indication of a season within a year, a crop to be harvested, or a type of vehicle; and wherein the processor is in data communication with the second user interface and further configured to:

determine, based on the obtained one or more parameters, the first route or the second route to be traversed, and determine or estimate, based on the obtained one or more parameters, the first amount of energy or the second amount of energy required by the vehicle.

19. The infrastructure planning tool of claim 15, further comprising:
a navigational system coupled to the processor and configured to obtain one or more locations of existing infrastructures or objects within the first off-road real property or the second off-road real property; and
wherein the processor is further configured to determine, based further on the one or more locations of the existing infrastructures or objects within the first off-road real property or the second off-road real property, the at least one location to place the number of charging or fuel stations.

20. The infrastructure planning tool of claim 15, wherein the processor is further configured to:
determine, based further on an installation cost or a recurring maintenance cost associated with placement of the number of charging or fuel stations, the at least one location to place the number of charging or fuel stations.

* * * * *